(12) United States Patent
Kimura

(10) Patent No.: US 6,722,800 B2
(45) Date of Patent: Apr. 20, 2004

(54) IMAGE PRINTING APPARATUS

(75) Inventor: Takeo Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/184,130

(22) Filed: Jun. 27, 2002

(65) Prior Publication Data

US 2003/0002898 A1 Jan. 2, 2003

(30) Foreign Application Priority Data

Jul. 2, 2001 (JP) ........................................ 2001-200735

(51) Int. Cl.⁷ ................................................ B41J 11/44
(52) U.S. Cl. .............................. 400/76; 400/61; 400/70
(58) Field of Search .............................. 400/76, 70, 61

(56) References Cited

U.S. PATENT DOCUMENTS 5,767,897 A * 6/1998 Howell ..................... 348/14.07
2002/0091724 A1 * 7/2002 Yokoe ......................... 707/500

FOREIGN PATENT DOCUMENTS

JP 11215455 A * 8/1999 .......... H04N/05/765
JP 2001160939 A * 6/2001 .......... H04N/05/76

* cited by examiner

*Primary Examiner*—Charles H. Nolan, Jr.
(74) *Attorney, Agent, or Firm*—Fitzpatrick, Cella, Harper & Scinto

(57) ABSTRACT

At least one printer is connected to an image source such as a digital camera via a network. When the printer receives a notification from the image source to switch a first image displayed on a display device to a second image, the printer displays an identifier of the second image according to the notification, and lights up an LED on a print button provided on the printer. When a period in which the printer is permitted to print the displayed image reaches a set time before a timeout, the LED on the print button is flashed. When the timeout is reached, the LED is turned off. When the print button is depressed, the printer sends a request for an image to the image source, receives image data for the image sent from the image source, and prints the image. When the print button is depressed to confirm a decision to print a displayed image while the printer is printing another image, the print decision is stored in a storage device in the printer, and the printer retrieves and executes the stored print decision after the ongoing printing operation is completed.

20 Claims, 13 Drawing Sheets

IMAGE PRINTING APPARATUS

BACKGROUND OF THE INVENTION

1. Field of the Invention

The present invention relates to an image printing apparatus that is connected to a network, and more particularly to an image printing apparatus that is capable of printing images displayed on an image display device that is connected to a common network that is connected to the printing apparatus.

2. Related Background Art

A combination of a digital camera and a color printer can create prints with the print quality that is comparable to the print quality of photographs created by a conventional silver-salt camera. Group photos, which are conventionally photographed and printed through the use of a silver-salt camera, can be provided with good quality by a digital camera and a printer.

Also, presentations, which are conventionally performed with the use of an overhead projector (OHP) and slides, can be performed with the use of a notebook type personal computer and a video projector.

However, when group photos are created by an ordinary digital camera and printed by a printer, some shortcomings are experienced. For example, multiple prints may need to be created for the number of people who are photographed and shown in the photos, or prints may need to be created for the number of people who want a particular photo, after checking the number of such people. This is nothing more than making copies of photos that are taken by a conventional silver-salt camera, which can be wasteful and time-consuming.

Furthermore, when generating documents to be distributed in a presentation that is carried out using a combination of an ordinary computer and a projector, multiple sets of the documents may need to be created in advance for the number of expected participants to the presentation, or only a predetermined number of such documents need to be prepared upon confirming the number of participants or destinations at which the documents are to be sent.

SUMMARY OF THE INVENTION

The present invention generally relates to an improvement of the operability in printing images. The present invention relates to a system, apparatus and method, which notifies to the user in a user-friendly manner as to whether the user can request images to be printed. The present invention also relates to a system, apparatus and method, which is capable of printing an image that is displayed on a display device even after the image is switched to another image during printing.

Other objects, features and advantages of the invention will become apparent from the following detailed description taken in conjunction with the accompanying drawings.

DETAILED DESCRIPTION OF THE PREFERRED EMBODIMENTS

Embodiments of the present invention will be described below with reference to the accompanying drawings.

Figure 1:
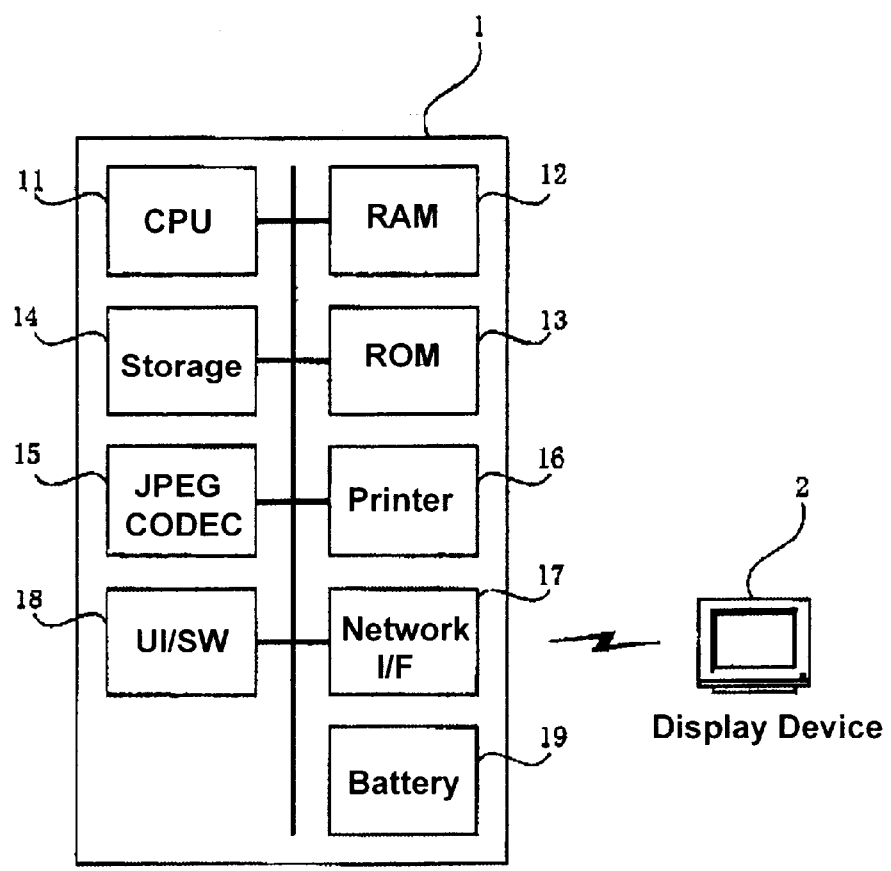
FIG. 1 schematically shows a basic structure of a system in accordance with an embodiment of the present invention.

FIG. 1 shows a basic structure of a system in accordance with an embodiment of the present invention.

Referring to FIG. 1, reference numeral 1 denotes an image printing apparatus, and reference numeral 2 denotes an image display device that displays images to be printed by the image printing apparatus 1, or an image supply device that stores image data that can be supplied to another apparatus, which are mutually connected through a network such that they can communicate with one another.

The image printing apparatus 1 includes a CPU 11 that performs operations on various data for controlling the image printing apparatus 1, a RAM 12 which is a memory device that stores various data during operations of the CPU 11, a ROM 13 that stores programs and various data to be executed by the CPU 11, an image storage device 14 such as a hard disk that may temporarily store image files such as JPEG image files that are sent from the image display device or image supply device 2, a decoding module 15 such as a JPEG (CODEC) module that expands the JPEG image files stored in the image storage device 14 for converting them into printable data and stores the data in the RAM 12, a printer module 16 that is equipped with a printing head, a paper feed/discharge motor and the like to print printable data created on the RAM 12, a network I/F 17 that communicates with the image display or image supply device 2, a user interface module 18 that is equipped with switches that provide printing instructions to the image printing apparatus 1 and an LCD, LED or the like that displays the condition of the image printing apparatus 1, and a power supply 19 such as a battery, an AC power supply, or the like that supplies driving power to the image printing apparatus 1.

The image printing apparatus 1 and the image display or image supply device 2 are connected through a network. The network can be a wired network such as, for example, Ethernet, IEEE1394 or the like, or a wireless network such as, for example, IEEE802.11b, Bluetooth or the like. In the first embodiment of the present invention, Bluetooth, one type of wireless network, is used as an example.

Bluetooth provides a wireless transmission system that operates in the unlicensed band at 2.4 GHz, and is jointly developed by member companies that contribute to Bluetooth SIG, a business association.

The published Bluetooth specification (version 1) provides functions to structure piconet that forms a network connecting maximum eight devices (seven devices when communicating simultaneously with one another), and a scatternet that forms a larger scale network connecting a plurality of piconets. One of the devices in the piconet functions as a master and all the remaining devices function as slaves. Also, the Bluetooth specification provides functions to authorize accesses to devices within the piconet by personal identification numbers (PIN), and to allow selection and connection of Bluetooth devices that are present within an area where communications can be established. In addition, the Bluetooth specification includes device profiles that are strictly regulated to realize mutual connections of devices, and systems of service discoveries for autonomously structuring networks among devices.

Figure 2:
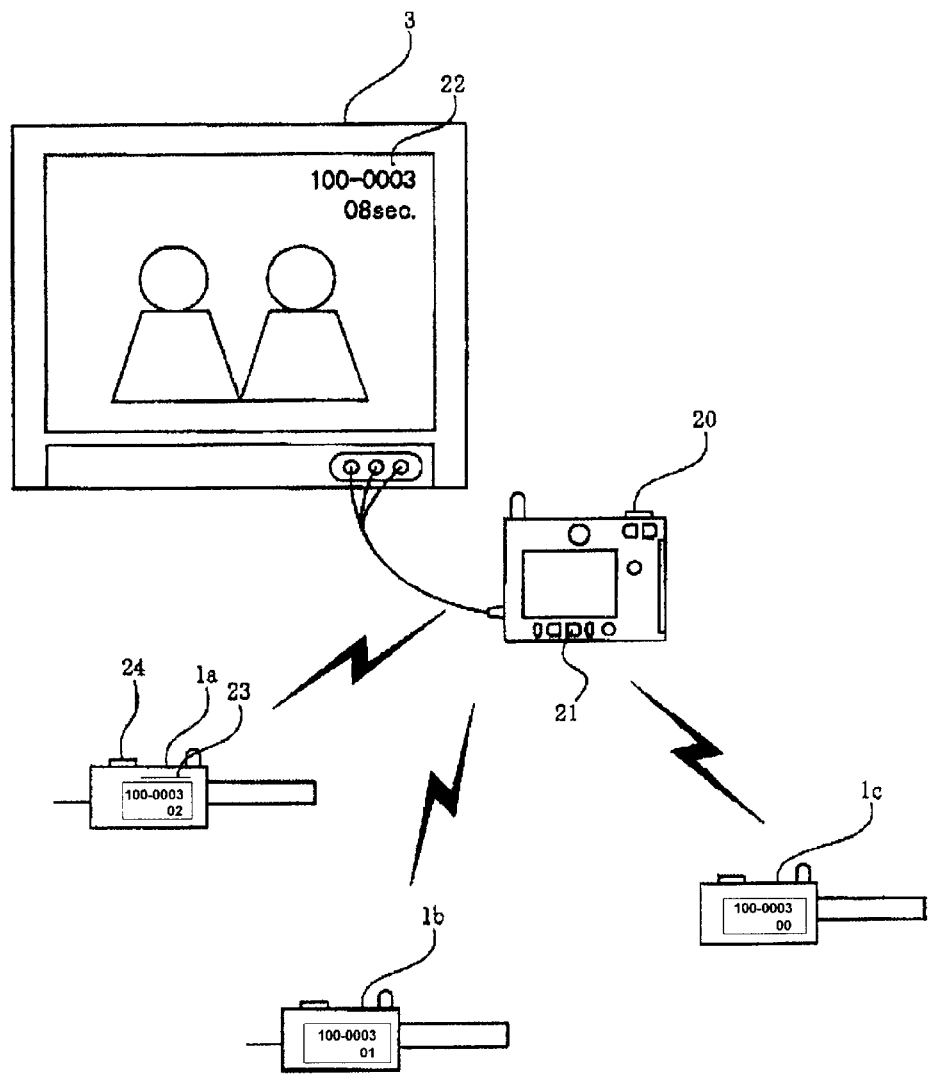
FIG. 2 schematically shows a connection structure in accordance with an first embodiment of the present invention.

FIG. 2 shows a connection structure including a digital camera (an image display device) and at least one printer (image printing apparatus) connected by a Bluetooth network. A plurality of printers may be connected by the network, as shown in FIG. 2. The printers may be any printers including portable printers and color portable printers.

In FIG. 2, reference numerals 1a, 1b and 1c denote portable color printers, reference numeral 20 denotes a digital camera, reference numeral 3 denotes a display device such as a large-size TV, a projector or the like connected to the digital camera 30 through a video cable. This setting allows many people to view images retained in the digital camera 20 at the same time. Each of the printers 1a, 1b and 1c has a structure that is generally the same as that of the image printing apparatus 1 shown in FIG. 1. The printers 1a, 1b and 1c are connected to the digital camera through the network I/F 17 shown in FIG. 1.

In this system, the printers 1a, 1b and 1c, and the digital camera 20 form a piconet. The digital camera 20 functions as a master in the piconet, and the printers 1a, 1b and 1c, which are slaves, can independently communicate with the master, i.e., the digital camera 20.

A method of image printing that is performed on the system in FIG. 2 will be described.

First, when the user handling the digital camera 20 sets the digital camera 20 in a replay mode and turns on the power, a first image is displayed on the display device 3, and at the same time, an identifier (file name, image number, image handler, etc.) of the displayed image and timeout information (seconds to accept the image) are sent to all of the printers 1a, 1b and 1c within the piconet. Also, when the user operates an operation button 21 on the digital camera 20 to switch the image to another image to be displayed, an identifier of the new image and timeout information are sent to all of the printers 1a, 1b and 1c.

At this moment, the display device 3 displays the image, the identifier of the image, and remaining seconds for accepting the image for printing while counting down the remaining seconds. The remaining seconds may eventually reach a timeout, which allows the user at the digital camera 20 to know an appropriate timing when he can switch displayed images. Images can be switched anytime after the timeout.

The printers 1a, 1b and 1c, which receive the identifier of the image and timeout information from the digital camera 20, display the identification information of the image on their respective display devices 23, for example, in an upper line in each display device, and turn on LEDs that are assembled in print buttons 24 provided on the respective printers. At the same time, each of the printers starts a countdown with the timeout information received being set as an initial value. For example, as the countdown reaches 5 seconds before the timeout, the LED on the print button 24 may be blinked, and when the countdown reaches the timeout, the LED on the print button 24 may be turned off. The display device 23, the print button 24 and the LED on the print button 24 may be included in the user interface module 18 shown in FIG. 1.

Operations on the print button 24 on each of the printers 1a, 1b and 1c may be validated from the start of countdown to the timeout (while the LED on the print button 24 is continuously lit or is blinking), and invalidated in other cases (when the LED on the print button 24 turns off).

In the embodiment example, a cancel button may be equipped with the user interface 18 on the printer 1 such that the user can sends his intention not to print (i.e., a no-print response) to the digital camera 20 before the timeout is reached, which improves the printing efficiency.

If the print button 24 on any of the printers is depressed, that printer sends a print response to the digital camera 20, and if the timeout is reached, the printer sends a no-print response to the digital camera 20. In one embodiment, when the digital camera 20 receives print-responses or no-print responses from all of the printers 1a, 1b and 1c, or the timeout is reached (for example, there may be a printer that has an abnormal printing condition), the digital camera 20 determines that the image on display can be switched to another image.

In the present embodiment, before depressing the print button 24, other buttons (e.g., ten-keys, up/down key, etc.) may be operated to designate the number of copies of the image on display. Each of the printers 1a, 1b and 1c may display the number of prints on the display apparatus 23 (for example, in a lower line thereof), and make prints in the number displayed at the time when the print button is depressed. FIG. 2 shows a situation where the printers 1a and 1b start printing, and the printer 1c does not start printing.

At this moment, in the present embodiment example, the printer 1c shifts to and stays in a power-saving mode until the display of the image is switched.

In the present embodiment example, even when any of the printers in the piconet is printing, the printer that is printing can immediately present to the user information that may be sent from the digital camera 20 each time a displayed image is switched to another image, and can return responses to the digital camera 20. Furthermore, if such information are to be printed, the printer successively stores the information in the RAM 12 within the printer. After completing the on-going printing, printing of an image associated with the stored information can be started even after the display of that image has been completed.

Figure 3:
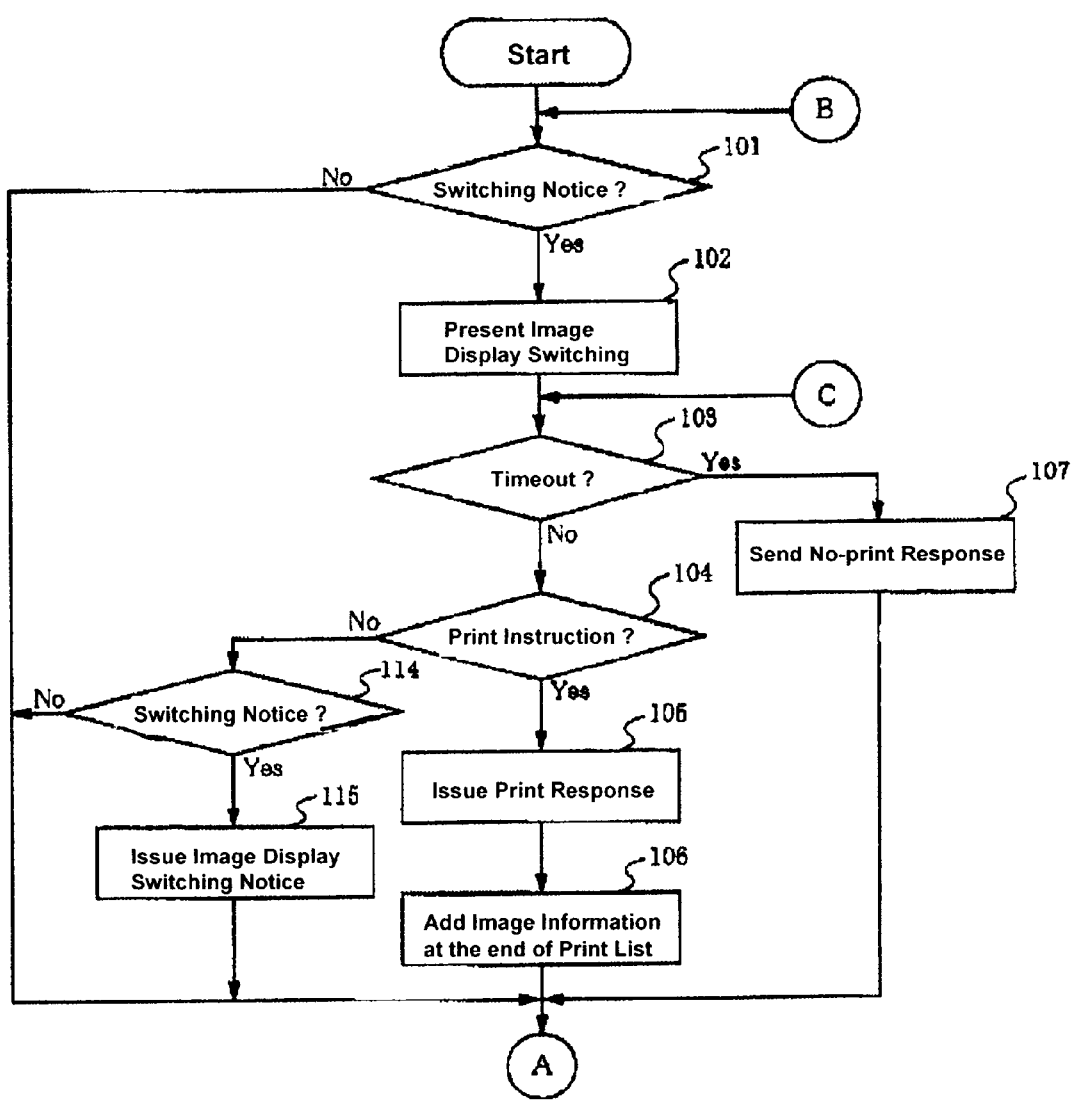
FIG. 3 shows a flowchart illustrating operation steps of the first embodiment.
Figure 4:
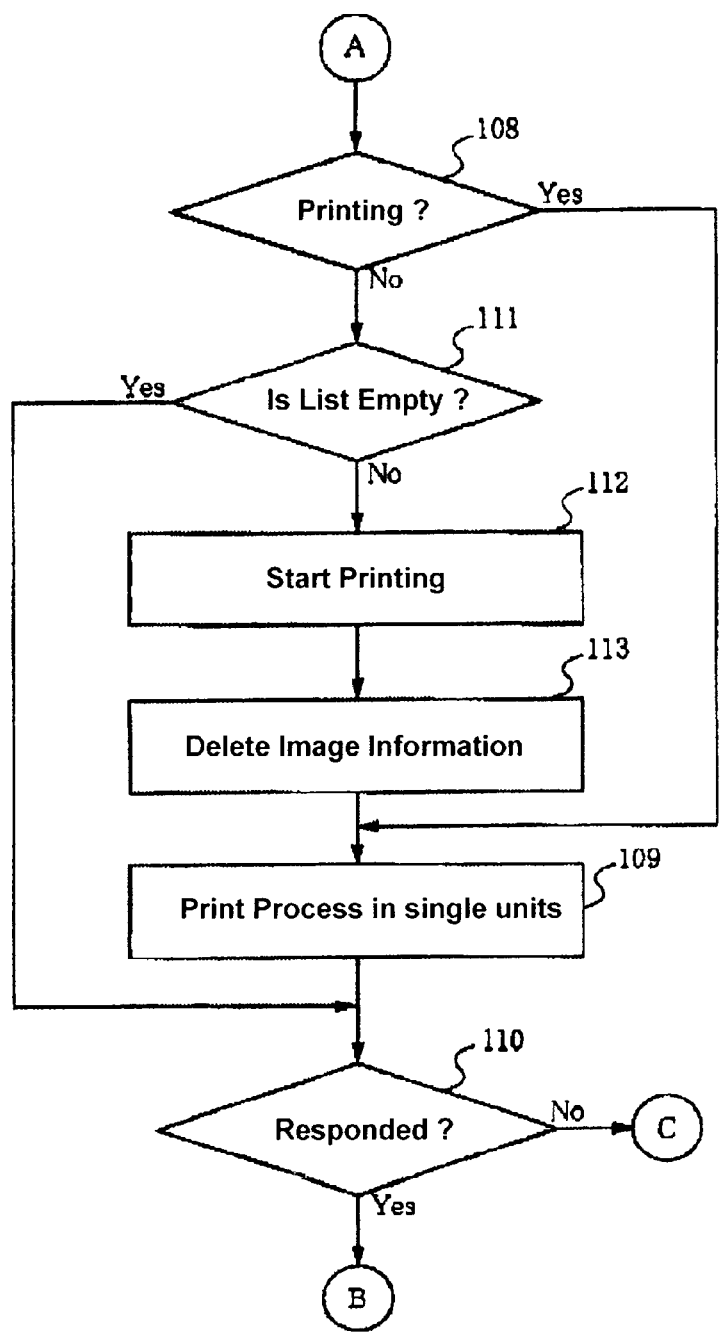
FIG. 4 shows a flowchart illustrating operation steps of the first embodiment.

FIGS. 3 and 4 show flowcharts of process steps performed by the printer 1, which is an image printing apparatus in accordance with the embodiment of the present invention. FIGS. 3 and 4 indicate part of steps in a program for the CPU 11, which is stored in the ROM 13 of the printer. The CPU 11 of the printer may be a microcomputer that runs the program read from the ROM 13. The ROM 13 is a storage medium that stores the program in a manner that the CPU 11 can read out. In another configuration, the program may be stored in a floppy disk or a CD-ROM, and the CPU 11 may read the program using a floppy disk driver or a CD-ROM driver (not shown in the drawing) and run the program. In this configuration, the floppy disk or the CD-ROM corresponds to a storage medium that stores the program in a manner that the CPU 11 can read out. Also, the program may be supplied to the CPU from outside through the network I/F 17. Operations performed by the printer 1 under the control of the CPU 11 will be described below.

When the power is turned on, and the printer 1 is placed in a state that can communicate with the digital camera 20, the printer 1 checks in step 101 as to whether or not an image display switching notification from the digital camera 20 has been present in the network I/F 17. If the image display switching notification has arrived, the printer renews the display content displayed on the display device 23, and waits an instruction from the user while turning on the LED in the print button 24 in step 102. In step 102, identification information (file name, image number, etc.) of an image to be displayed after the previous image is switched is displayed on the display device 23. In other words, upon receiving an image display switching notification from the digital camera 20, the LED in the print button 24 turns on to let the user know that the image can be printed by operating the print button 24.

At the same time when the image display switching notification is received, timeout information included in the image display switching notification is set to an initial value, and a countdown of the response timer is started. In step 103, a determination is made as to if the timeout is reached, and in step 104, a determination is made as to whether a print execution instruction is present.

If the timeout is reached in step 103, it is determined that the notified image is not to be printed, and a no-print response is returned through the network I/F 17 to the digital camera 20 in step 107, and at the same time, the LED within the print button 24 is turned off. The timeout indicates that a period in which the print button 24 can instruct a printing operation is completed.

If a print execution is instructed through the print button 24 in step 104, a print response is returned through the network I/F 17 to the digital camera 20 in step 105, and image information (identification information for the image) included in the image display switching notification is added to the last of a print list stored in the RAM 12 of the printer 1 in step 106.

When no instruction of a print execution is found in step 104, a period of time until the timeout is reached is checked, and a determination is made as to whether or not an image display switching should be notified in step 114. If the period of time until the timeout is reached is shorter than a pre-set period of time, this is notified to the user by, for example, blinking the LED within the print button 24 in step 115.

When a series of processing steps which starts in step 101 is completed, a determination is made again in step 108 as to whether the printer 1 is currently printing. If it is printing, a printing process in a single unit is conducted in step 109.

The printing process in a single unit may be defined as a finely divided process such as a process for one line of the image at a time. For example, in this embodiment example, when an image display switching notification from the digital camera 20 is detected through polling, the printing process is divided and progressed bit by bit so that the response will not be extremely delayed.

As the printing process is progressed, a determination is made in step 110 as to whether or not the latest image display switching notification from the digital camera 20 is responded. If a print response or a no-print response has been made, the process returns to step 101, and the next image display switching notification is checked. On the other hand, neither a print response or a no-print response has been made to the latest image display switching notification, the process returns to step 103, and waits for an instruction from the user with respect to the latest image display switching notification.

When it is determined in step 108 that the printer is not printing, the print list is checked in step 111 as to whether or not the print list is empty. If it is empty, the process proceeds to step 110. If it is determined in step 111 that the print list is not empty, the printer requests in step 112 image data having image information (identification information of an image) at the head of the print list through the network I/F 17 to the digital camera 20, starts printing with the printer module 16, and deletes in step 113 the data at the head of the print list that the printer started printing. Then the printer prints image data (JPEG image file) received through the network I/F 17 from the digital camera 20 in a single unit, in step 109.

Figure 5:
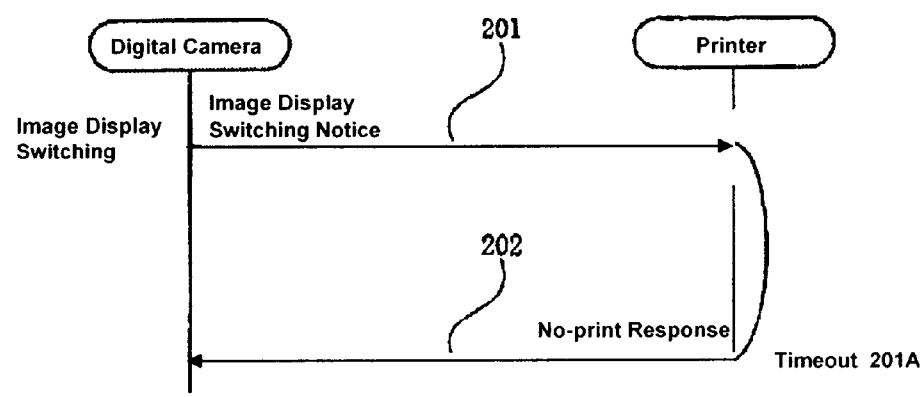
FIG. 5 shows a flow of data in the first embodiment.
Figure 6:
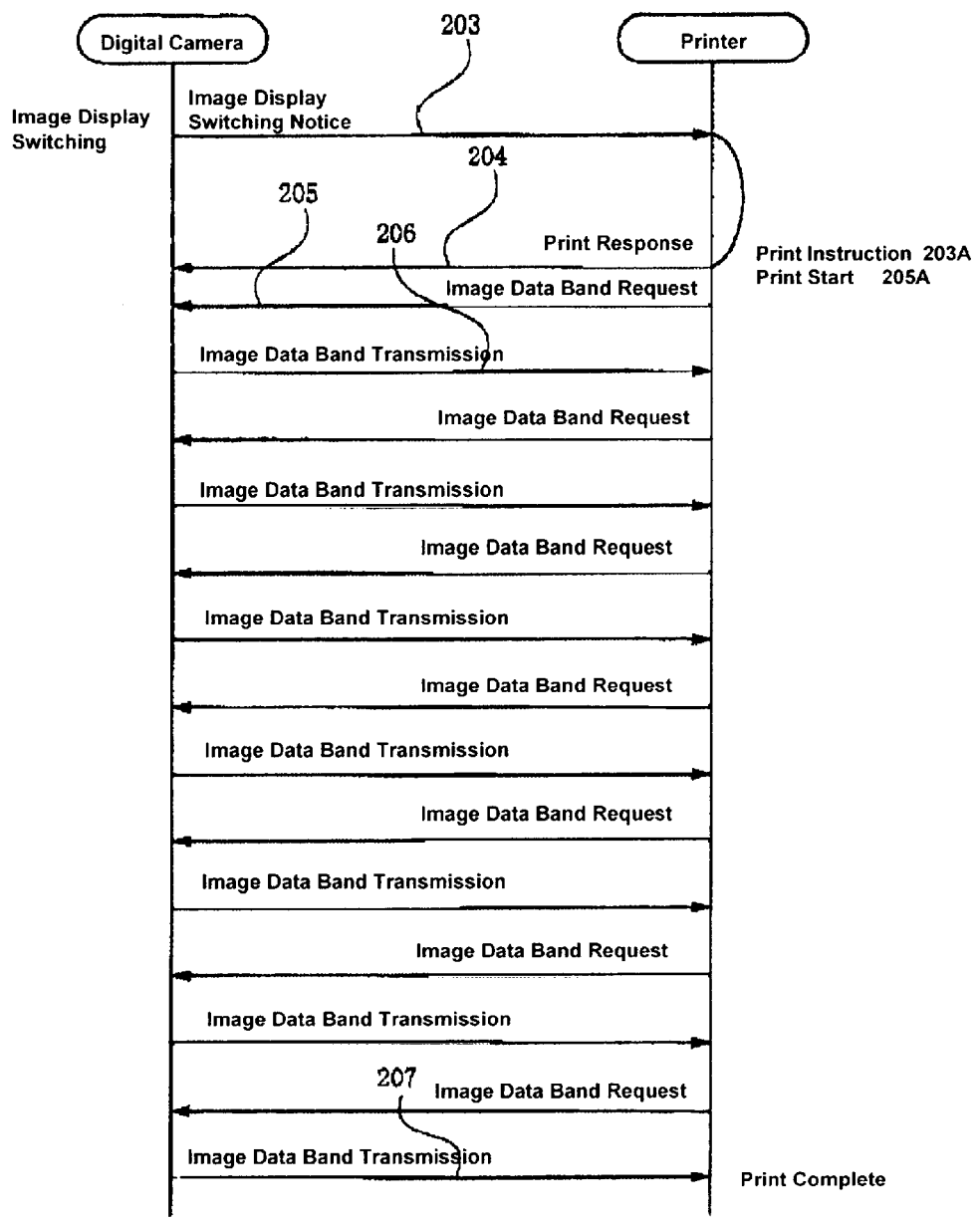
FIG. 6 shows a flow of data in the first embodiment.
Figure 7:
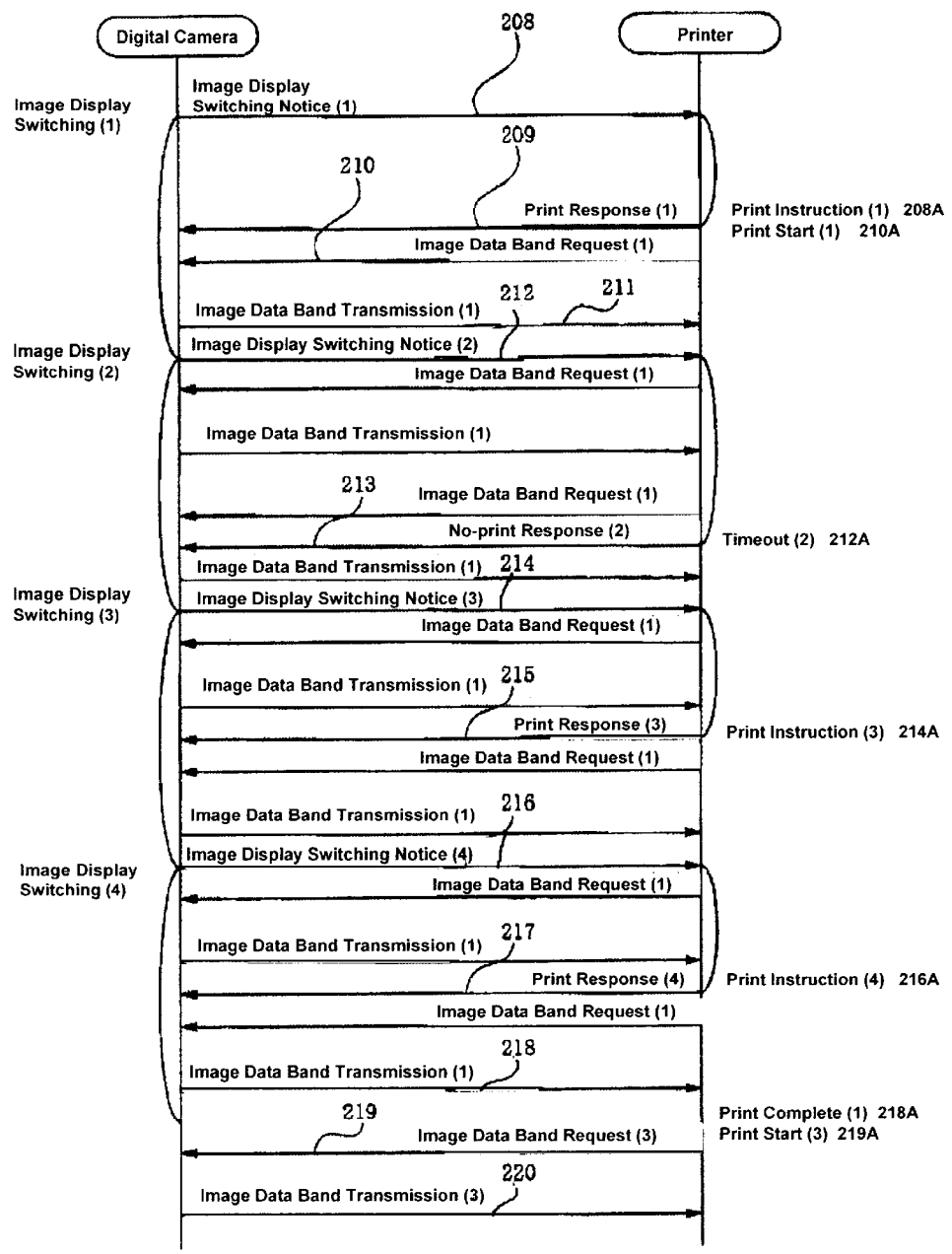
FIG. 7 shows a flow of data in the first embodiment.

FIGS. 5, 6 and 7 show exchanges of messages and data between the printer 1 and the digital camera 20 along the passage of time. The passage of time is indicated from top to down in the figure.

FIG. 5 shows a case when an image that is displayed on the digital camera 20 (the display 3 on the digital camera 20) is not printed.

In this case, after having received an image display switching notification (image information and timeout value) 201 from the digital camera 20 (step 101 in FIG. 3), the printer 1 sends a no-print response 202 (step 107) after a designated timeout 201A is reached (step 103).

FIG. 6 shows a case in which an image displayed on the digital camera 20 is printed.

In this case, after having received an image display switching notification 203 from the digital camera 20 (step 101 in FIG. 3), when there is a print instruction 203A given within the designated timeout period (step 104), the printer 1 starts printing (step 112, 205A), and sends a print response 204 (step 105).

The printer 1 sends requests for image data band 205 using the image information designated in the image display switching notification 203 (step 112), receives transmissions of the image data bands 206 from the digital camera 20 in response to the requests, and successively prints them (step 109). Then, a required number of image data band requests and transmissions are repeated, and the printing operation is completed with the transmission of the last image data band 207.

FIG. 7 shows a case in which an image displayed on the digital camera 20 is printed, and further the printer 1 responses to image display switching notifications during printing.

In this case, when the printer has received an image display switching notification 208 for an image (1) from the digital camera 20 (step 101 in FIG. 3), and a print instruction 208A is given within the designated timeout period (step 104), the printer 1 sends a print response 209 (step 105), and adds image (identification) information to the last of the print list (step 106). The printer 1 starts printing (step 112, 210A), sends requests for image data bands 210 using the image information designated in the image display switching notification 208, receives transmissions of the image data 211 from the digital camera 20 in response to the requests, and successively prints them (step 109). The image (identification) information for the image (1) added to the print list in step 106 is deleted from the list in step 113 at the time when the printer starts printing in step 112. After a required number of image data band requests and transmissions are repeated, the printing operation is completed.

In the case shown in FIG. 7, displayed images are switched many times on the digital camera 20 during printing an image.

In FIG. 7, an image display switching notification 212 for an image (2) is made (step 101) while the printer is printing the first image (1). Since this second image (2) is not printed, the printer sends a no-print notification 213 (step 107) after the timeout period 212A (step 103). More specifically, the printer receives an image data band transmission 211, and prints the same (step 109). Then the process proceeds to step 110 and to step 101. As the image display switching notification 212 for the image (2) is received, the printer presents the image display switching notification 212 for the image (2) (step 102). The process proceeds through "No" in step 114, and "Yes" in step 108. In step 109, the printer sends an image data band request for the image (1) to the digital camera 20, receives an image data band from the digital camera 20, and prints a single unit of the image (1). At this moment, when the timeout 212A for the image (2) occurs while the image (1) is being printed, a no-print response for the image (2) is returned to the digital camera 20 while the image data band for the image (1) is being received.

When another image display switching notification 214 for a still next image (3) is made during printing the first image (1), and there is a print instruction 214A from the print button 24 to instruct that this image (3) be printed (step 104), a print notification 215 is immediately made (step 105). At this moment, image information notified with respect to the image (3) is added to the print list (which is empty in the current state) within the printer 1 (step 106). More specifically, from the time the image display switching notification 214 for the image (3) is received to the time when the print notification 215 is returned to the digital camera 20, the process proceeds through "No" in step 110, and "No" in step 103, to step 104, and if a print execution instruction is detected in step 104, the print notification 215 is returned to the digital camera 20. Then, the image information for the image (3) is added to the print list in step 106.

During printing the first image (1), another image display switching notification 216 for a yet another image (4) is made (step 101), and there is a print instruction 216A to instruct that this image (4) be printed (step 104), a print notification 217 is immediately made (step 105). At this moment also, image information notified with respect to the image (4) is added to the print list (which has the information for the image (3) already written in the current state) within the printer 1 (step 106).

The printing of the first image (1) is completed with the image data band transmission 218 for the image (1). After the printing is completed (step 108, 218A), the process proceeds through "Yes" in step 110, "No" in step 101, "No" in step 108, to step 111 at which the print list is checked. Since the information for the image (3) and the image (4) are described in the print list, a printing operation is started (step 112, 219A) for the first image (3) that has been stored earlier than the other, and a required number of image data band requests 219 and transmission are repeated to perform the printing operation (step 113, 109). Then, after the printing of the image (3) is completed, a printing operation for the image (4) is performed.

In this example, one print is printed for each of the images. However, in another embodiment example, the printer may be structured so that multiple prints for each image can be printed. In this case, the number of prints for each image may be recorded in the print list, and prints of the recorded number may be printed.

By the structure described above, images displayed on the digital camera 20 can be reliably printed. Also, even when displayed images on the digital camera 20 are switched while the printer 1 is printing, information for the images are stored successively in the print list such that printing of the images is reserved, and all of the prints desired by the user can eventually be obtained.

Next, a second embodiment of the present invention will be described.

Figure 8:
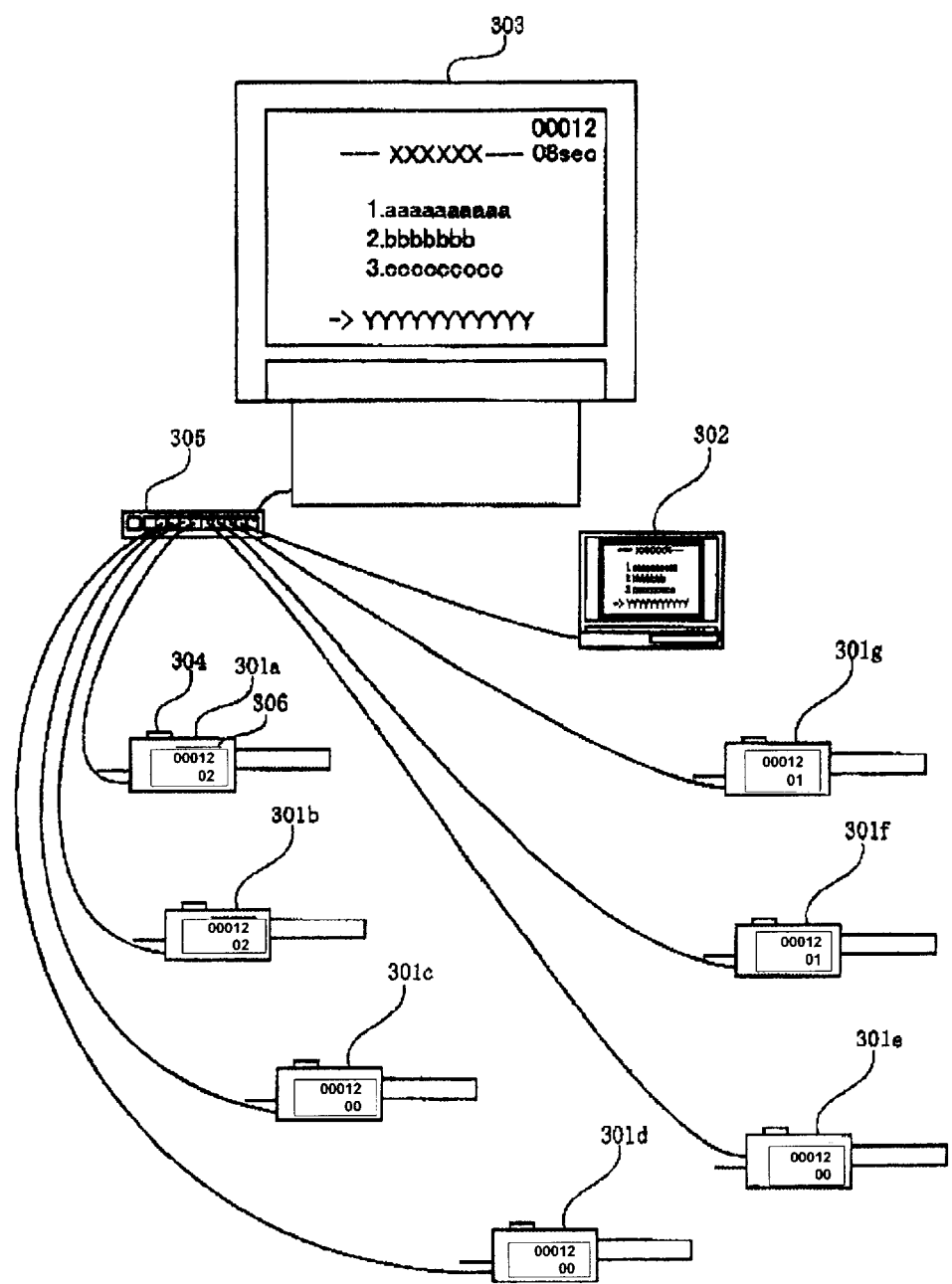
FIG. 8 schematically shows a connection structure in accordance with a second embodiment of the present invention.

FIG. 8 shows a connection structure of a LAN in which printers (image printing apparatuses) 301a–301g, a computer (image supply apparatus) 302, and a projector (image display apparatus) 303 are mutually connected via network cables. The printers may be any printers including portable printers and color portable printers. The devices and apparatuses in the network can be mutually communicated through a network hub 305. Each of the printers 301a–301g is an image printing apparatus in accordance with the present embodiment. Each of the printers 301a–301g may have a structure similar to that of the image printing apparatus 1 shown in FIG. 1. The network I/F 17 in FIG. 1 is connected through the network hub 305 to the computer 302 and the projector 303.

The present embodiment assumes a situation such as a presentation or a seminar, where the speaker operates the computer 302, and the audiences can individually operate the printers 301 of their own. In the embodiment example, a wired network is structured, but the present invention is also applicable to a wireless network.

An image printing method applicable to the system shown in FIG. 8 will be described.

When the printers 301a–301g and the projector 303 on the LAN are switched on, they can communicate with the computer 302 on the same LAN. Each of the printers 301a–301g and the projector 303 sends to the computer 302 a request for an image list that describes information for all images to be displayed that are retained at the computer 302, and each of the devices receives and stores the image list.

Then, when the user operates the computer 302 to switch a displayed image to another image, the computer 302 sends an image display switching notification (an image number and a timeout value for the image in the image list) to the printers 301a–301g and the projector 303. Upon receiving the image display switching notification, the projector 303 immediately sends a request for image data for the image to the computer 302 and displays the request. At this time, the projector 303 displays the image, the image number of the displayed image, and remaining seconds for accepting the image for printing while counting down the remaining seconds. The remaining seconds may eventually reach a timeout, which allows the user of the computer 302 to know an appropriate timing when he can switch the displayed image. The user at the computer 302 can switch images anytime after the timeout.

Each of the printers 301a–301g, which receives the image display switching notification from the computer 302, displays the image number of the image on each display device 306, for example, in an upper line in the display device 306, and turns on an LED that is assembled in each print button 304 provided on each of the respective printers to notify to the users at the respective printers that there is the notification from the computer 302. At the same time, each of the printers starts a countdown with the timeout information received being set as an initial value. For example, as the countdown reaches 5 seconds before the timeout, the LED on the print button 304 may be blinked, and when the countdown reaches the timeout, the LED 304 on the print button 24 may be turned off. The display device 306, the print button 304 and the LED on the print button 304 may be included in the user interface shown in FIG. 1.

Operations on the print button 304 may be validated from the start of countdown to the timeout (while the LED on the print button 304 is continuously lit or is blinking), and invalidated in other cases (when the LED on the print button 304 turns off).

In accordance with another embodiment example, considering a time lag from the time the image display switching notification is received to the time the image is actually displayed on the projector 303, the timing to light the LED on the print button 304 (to validate operations on the print button 304) may be delayed. Furthermore, in still another embodiment example, the computer 302, after sending image data to the projector 302, may send to the printers 301a–301g signal for lighting, blinking or turning off the LED on the print button 304. In other words, in this embodiment example, the time measurement of a period in which the print button 304 can instruct printing is performed by the computer 302, instead of the printers 301a–301g.

When any of the print buttons 304 is depressed by the users at the respective printers 301a–301g while operations on the print buttons 304 are effective, the printers 301a–301g with the print buttons 304 depressed send requests for image data (JPEG image file) to the computer 302, and start printing.

In another embodiment example, any of the printers 301a–301g which do not print a notified image shift to and stay in a power-saving standby mode. Furthermore, in accordance with still another embodiment, before depressing the print button 304, other buttons (e.g., ten-keys, up/down keys, and the like in the user interface 18) may be operated to designate the number of prints to be made for an image being displayed. The number of prints designated is displayed on a display device 306 of each of the corresponding printers 301a–301g (for example, in a lower line in the display device 306), and the image is printed in the number displayed at the time the print button is depressed.

Also, since each of the printers 301a–301g retains the information for all of the images to be displayed, in accordance with yet another embodiment, appropriate buttons on each of the printers may be operated to change the image numbers to select images, and printing of the selected images can be started without regard to whether or not these images are displayed.

In the present embodiment, to enable switching of displayed images even when any of the printers on the LAN are printing, a notification that is sent from the computer each time a displayed image is switched is immediately presented to the users at the respective printers even when the printers are printing. Furthermore, if notified images are to be printed by any of the printers, image numbers of the notified images are successively stored in those printers. When the on-going printing is completed, images corresponding to the stored image numbers can be printed even after the display of the images are completed.

Figure 9:
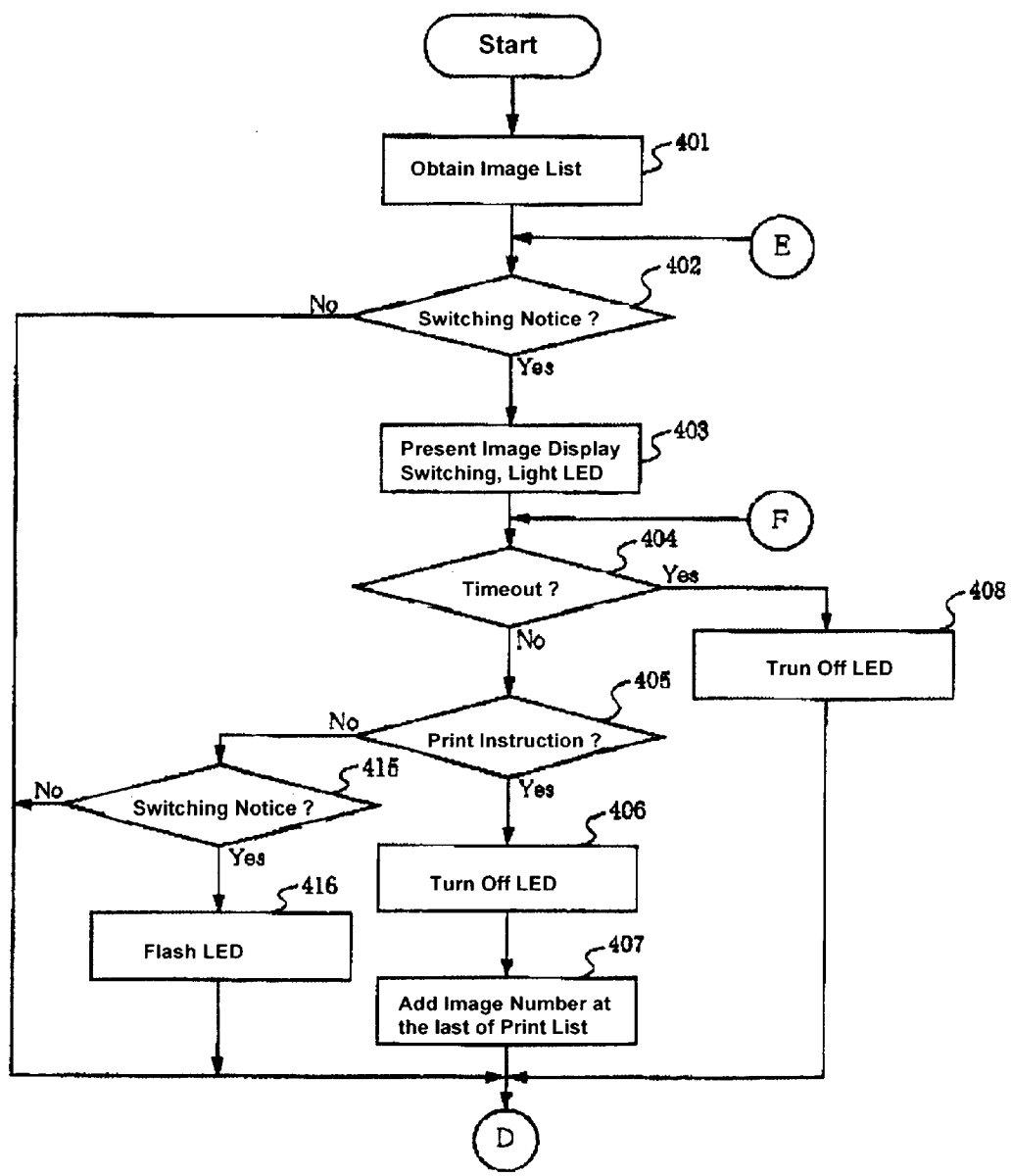
FIG. 9 shows a flowchart illustrating operation steps of the second embodiment.
Figure 10:
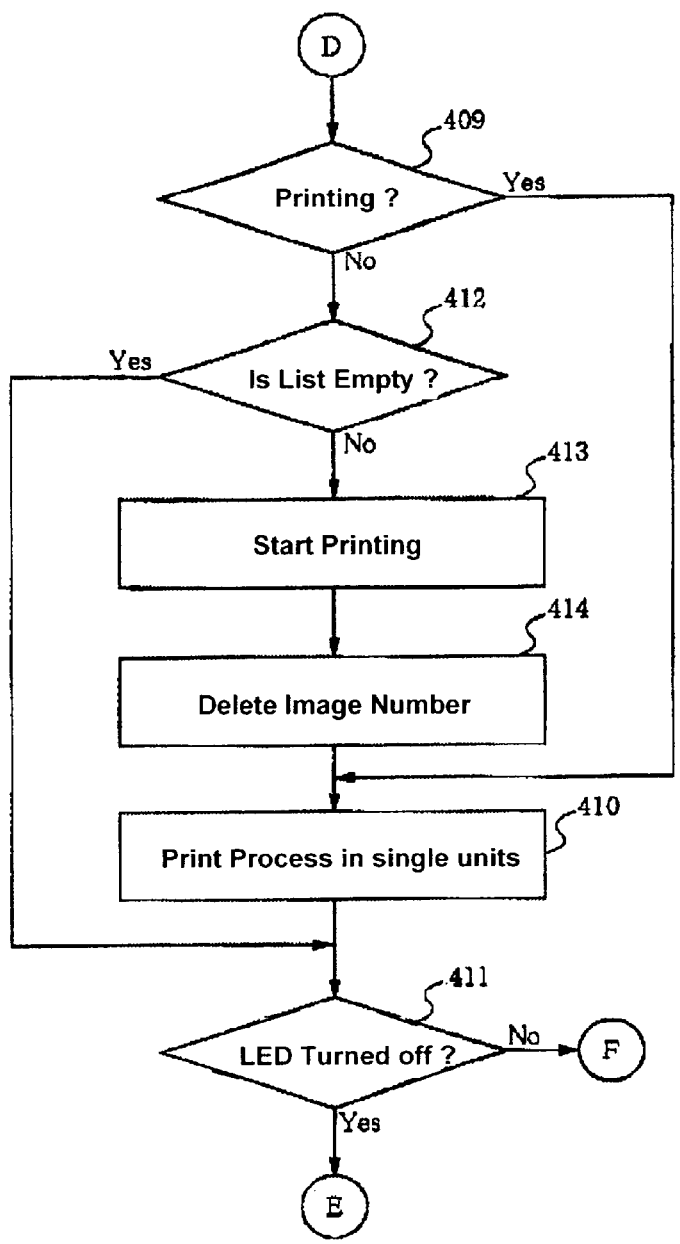
FIG. 10 shows a flowchart illustrating operation steps of the second embodiment.

FIGS. 9 and 10 show flowcharts of process steps performed by the image printing apparatuses. FIGS. 9 and 10 indicate part of steps in a program for the CPU 11, which is stored in the ROM 13 of each of the printer 301a–301g (hereafter generally referred to as the "printer 301"). The CPU 11 of the printer 301 may be a microcomputer that runs the program read from the ROM 13. The ROM 13 is a storage medium that stores the program in a manner that the CPU 11 can read out. In another configuration, the program may be stored in a floppy disk or a CD-ROM, and the CPU 11 may read the program using a floppy disk driver or a CD-ROM driver (not shown in the drawing) and run the program. In this configuration, the floppy disk or the CD-ROM corresponds to a storage medium that stores the program in a manner that the CPU 11 can read out. Also, the program may be supplied to the CPU from outside through the network I/F 17. Operations performed by the printer 301 under the control of the CPU 11 will be described below.

When the power is turned on, the printer 301 is placed in a state in which the printer 301 can communicate with the computer 302, the printer 301 obtains an image list describing information (number, identifiers such as file names, image numbers, image handles, comments, etc.) for all images retained by the computer 302 through the network I/F 17, in step 401.

The printer 301 checks in step 402 as to whether or not an image display switching notification (image number notification) has been present in the network I/F 17. If the image display switching notification has arrived, the printer 301 renews the display content displayed on the display device, and waits an instruction from the user while turning on the LED in the print button 304 in step 403. At the same time, the printer 301 sets the timeout information included in the image display switching notification to an initial value and starts a countdown. In other words, when the printer 301 receives an image display switching notification from the computer 302, the LED installed in the print button 304 turns on to indicate that the print button 304 can be operated to print an image corresponding to the image number.

Then, in step 404, a determination as to the timeout is made, and in step 405, a determination as to the presence or absence of a print execution instruction is made. In step 403, the display device on the printer 301 displays the number of an image corresponding to the image display switching notification, which is displayed after switching.

If the timeout is reached in step 404, it is determined that the notified image is not to be printed, and the LED on the print button 304 is turned off in step 408. The timeout indicates that a period in which the print button 304 can instruct a printing operation is completed.

If a print execution is instructed in step 405, the LED on the print button 304 is turned off in step 406, and the notified image number is added to the last of the print list retained in the RAM 12 of the printer 301 in step 407.

When no instruction of a print execution is found in step 405, a period of time until the timeout is reached is checked, and a determination is made as to whether or not an image display switching should be notified in step 415. If the period of time until the timeout is reached is shorter than a pre-set period of time, this is notified to the user by, for example, blinking the LED within the print button 304 in step 416.

In still another embodiment example, the computer 302 may send to the printer 301 a signal for lighting, flashing or turning off the LED on the print button 304. In other words, in this embodiment example, the time measurement of a period in which the print button 304 can instruct printing is performed by the computer 302, instead of the printers 301.

When a series of processing steps which starts in step 402 is completed, a determination is made again in step 409 as to whether the printer 301 is currently printing. If it is printing, a printing process in a single unit is conducted in step 410. The printing process in a single unit may be defined as a finely divided process such as a process for one line of the image at a time. For example, in this embodiment example, when an image display switching notification from the computer 302 is detected through polling, the printing process is divided and progressed bit by bit so that the response will not be extremely delayed.

As the printing process is progressed, a determination is made in step 411 as to whether or not the LED on the print button is turned off (operations on the print button are invalidated). If the LED is turned off, the process returns to step 402, and the next image display switching notification is checked. On the other hand, when the LED is lit or blinking, the process returns to step 404, and waits for an instruction from the user with respect to the latest image display switching notification.

When it is determined in step 409 that the printer is not printing, the print list is checked in step 412 as to whether or not the print list is empty. If it is empty, the process proceeds to step 411. If it is determined in step 412 that the print list is not empty, the printer requests in step 413 image data having the image number at the head of the print list through the network I/F 17 to the computer 302, starts printing with the printer module 16, and deletes in step 414 the data at the head of the print list that the printer started printing. Then the printer 301 prints image data (JPEG image file) received from the computer 302 at the printer section 16, in step 410.

Figure 11:
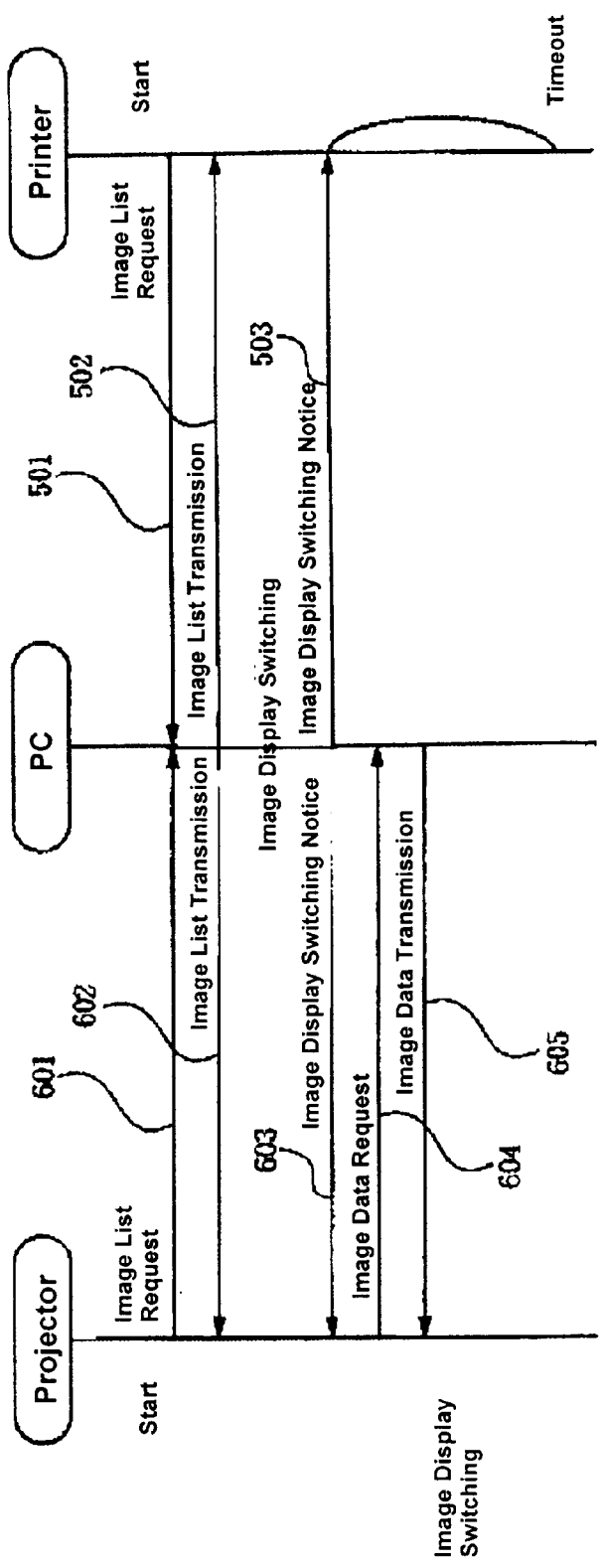
FIG. 11 shows a flow of data in the second embodiment.
Figure 12:
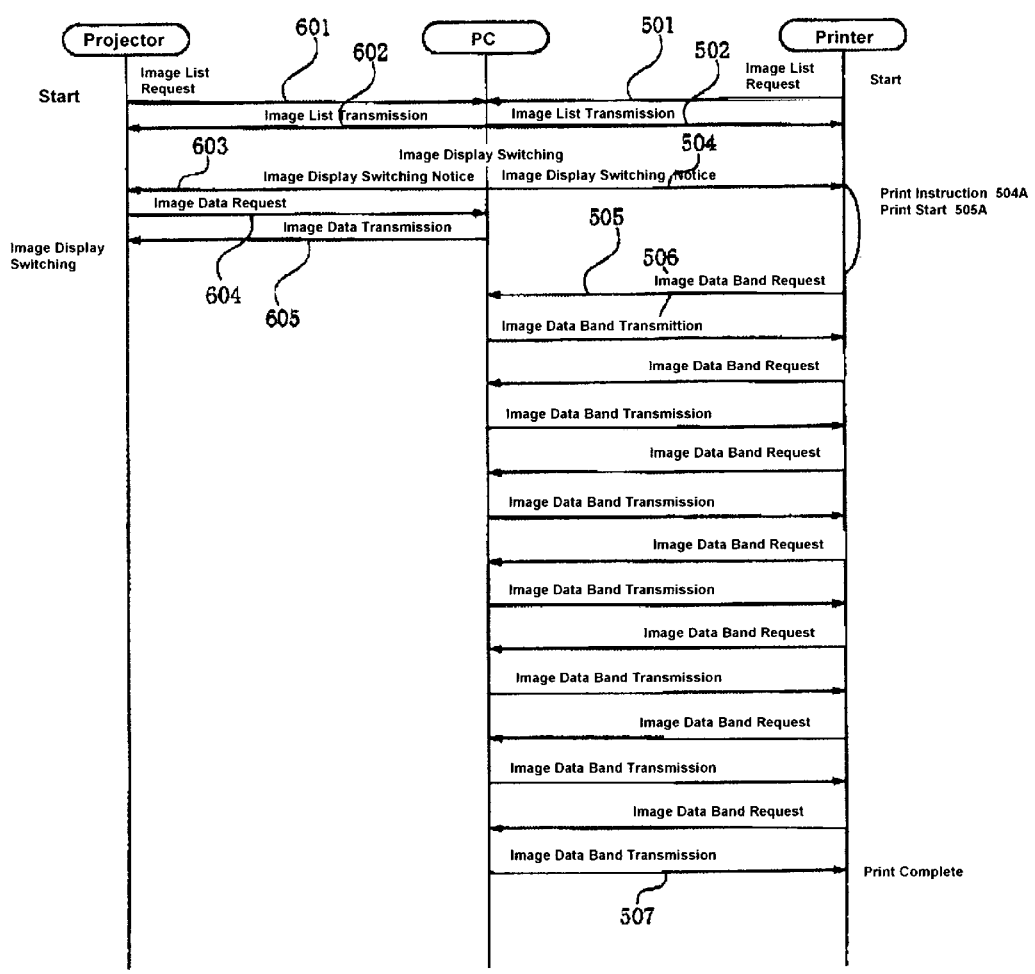
FIG. 12 shows a flow of data in the second embodiment.
Figure 13:
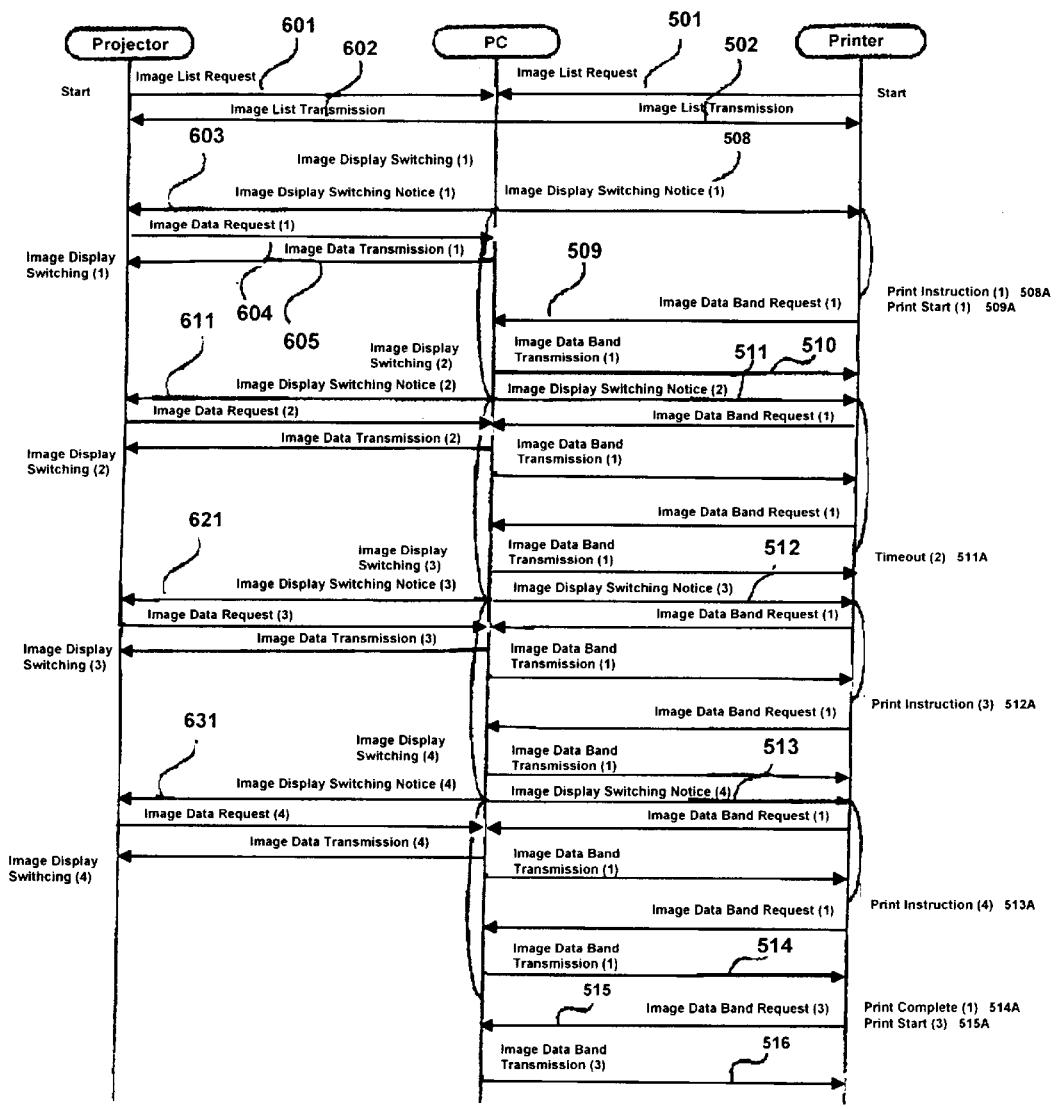
FIG. 13 shows a flow of data in the second embodiment.

FIGS. 11, 12 and 13 show exchanges of messages and data between the printers 301, the computer 302 and the projector 303 along the passage of time. The passage of time is indicated from top to down in the figure.

FIG. 11 shows a case when an image that is displayed on the projector 303 is not printed.

First, the printer 301 and the projector 303 send requests for an image list to the computer 302 (501, 601), and the computer sends the image list (502, 602). The request for the image list and the reception thereof correspond to a process step in step 401 in FIG. 9. Then, the printer 301 receives an image display switching notification (image information and timeout value) 503 from the computer 302 (step 402), but does not return a response to the computer 302.

In the mean time, when the projector 303 receives an image display switching notification (image information and timeout value) 603 from the computer 302, the projector 303 requests image data corresponding to the notification (604), and receives and displays the image data sent from the computer 302 (605).

FIG. 12 shows a case when an image displayed on the projector 303 is printed.

In this case, after having received an image display switching notification 504 from the computer 302 (step 402 in FIG. 9), when there is a print instruction 504A given within the designated timeout period (step 405), the printer 301 starts printing (step 413), and sends requests for image data bands for the designated image number (505), receives the image data bands in response to the requests from the computer 302 (506), and successively prints them (step 410). A required number requests for and transmissions of image data bands are repeated, the printing operation is completed with the transmission of the last image data band 507.

It is noted that the projector 303 operates in the same manner as in the case when an image displayed is not printed (see FIG. 11).

FIG. 13 shows a case in which an image displayed on the projector 303 is printed, and image display switching notifications are issued even during printing.

In this case, after the printer 301 has received an image display switching notification 508 from the computer (step 402 in FIG. 9), and there is a print instruction to print an image (1) given from the print button 304 (step 405, 508A), the printer 301 starts printing (step 413, 509A), requests image data bands for the designated image number (509), receives the image data bands responding to the requests (510), and performs a printing process in single units (step 410). The image number for the image (1) is written in the print list in step 407, but deleted from the print list in step 414 when the printer starts printing in step 413. A required number of image data band requests and transmissions are repeated, the printing operation is completed with the transmission of the last image data band 514 (step 410, 514A).

In the case shown in FIG. 13, displayed images are switched many times on the computer 302 during printing an image.

In FIG. 13, an image display switching notification 511 for the next image (2) is made (step 402) while the printer is printing the first image (1). Since this second image (2) is not printed, the timeout is reached (step 404, 511A).

Also, while the first image (1) is being printed, an image display switching notification 512 for a still another image (3) is issued (step 402), and if there is a print instruction 512A to instruct that this image be printed (step 405), the printer 301 immediately adds a notified image number for the image (3) to the print list (which is empty in the current state) within the printer 301 (step 407).

Also, while the first image (1) is being printed, an image display switching notification 513 for a yet another image (4) is issued (step 402), and if there is a print instruction 513A to instruct that this image be printed (step 405), the printer 301 immediately adds a notified image number for the image (4) to the print list (which already contains a description of the information for the image (3) in the current state) within the printer 301 (step 407).

The printing operation for the image (1) is completed with the last image data band transmission 514 for the image (1). After completing the printing operation (step 409), the print list is checked (step 412). Since the information for the images (3) and (4) is described in the print list, a required number of image data band requests 515 and transmissions 516 for the image (3) at the head of the print list are repeated to print the image (3) (step 413, step 410).

After the printing operation for the image (3) is completed, the image (4) is printed.

In the present embodiment example, one print for each image is printed. However, in another embodiment, the printer is structure such that multiple prints for each image can be printed. In such a structure, the number of prints for each image may be recorded in the print list, and prints for each image in the number recorded will be printed.

In the mean time, the projector 303 requests and receives image data at each of the image display switching notifications 603, 611, 621, and 631 sent form the computer 302, and display the image data.

By the structure described above, images displayed on the projector 303 can be reliably printed. Also, even when displayed images are switched by the computer 302 while the printer 301 is printing, information for the images are stored successively in the print list such that printing of the images is reserved, and all of the prints desired by the user can eventually be obtained.

Also, the system may be structured such that an information list containing all images to be displayed may be received in advance by all of the printers, and responses are not returned to image switching notifications. By this structure, data transfer prior to a presentation (for preparation of the presentation) may take time, but the amount of data to be transferred at the time of image switching operations during the presentation can be reduced. By such a structure, it is expected that image switching operations can be performed more effectively when many more devices are connected to the system.

In accordance with another embodiment of the present invention, in addition to the structures of all of the embodiments described so far, the printing apparatus may be equipped with an image storage device having a large storing capacity for storing images. Received image data may be successively stored in the storage device on the printing apparatus instead of printing the image data, or may be successively stored and printed at the same time. The printing apparatus may further be equipped with a device that selects between printing and storing received image data. Furthermore, in another embodiment, the printing apparatus may be equipped with a memory card device with a card slot, and the user may load his own memory card on the memory card device such that the user can carry image data on the memory card, or both of prints and image data on the memory card.

In the embodiments described above, when the operator who transfers image data may set a flag on the image data that permits or prohibits to re-edit or re-distribute the image data. When the printing apparatus receives image data with a flag that permits only printing, the printing apparatus prints the image data, but does not store the image data in the image storage device. In other words, the printing apparatus may be equipped with a device that detects or determines if storage of the received data is permitted, and controls the storage of image data according to the detected or determined result.

Also, in another embodiment, the printing apparatus may allow to store image data in the image storage device only when printing media such as recording paper are not available.

Further, the printing apparatus may be provided with a structure that allows the user to select between printing and storing images being displayed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A recording apparatus comprising:
    a request device that requests data from a data source;
    a recording device that records data received from the data source;
    a display device that performs a first display in accordance with a signal from the data source, the first display indicating that requesting data by the request device is acceptable; and
    a control device that controls the display device in accordance with a predetermined time period in which requesting data by the request device is acceptable.

2. A recording apparatus according to claim 1, wherein the predetermined time period is counted by a counting device, and the control device controls the display device in accordance with counting of the predetermined time period.

3. A recording apparatus according to claim 2, wherein the control device controls the display device depending on whether the predetermined time reaches a timeout.

4. A recording apparatus according to claim 1, wherein the display device performs a second display after performing the first display and before the end of the predetermined time period in which requesting data by the request device is acceptable.

5. A recording apparatus according to claim 1, wherein the request device comprises a storing device that stores an instruction for requesting the second data, and requests second data from the data source after the first data is received from the data source.

6. A recording apparatus according to claim 1, wherein the request device comprises a receiving device that receives a list of the data, and requests the data included in the list.

7. A recording apparatus according to claim 1, wherein the recording device comprises a storing device that stores the data received from the data source, and a selecting device that selects between recording the data and storing the data.

8. A recording apparatus according to claim 1, wherein the recording device comprises a storing device that stores the data, and a judging device that judges whether or not the data is allowed to be stored.

9. A recording apparatus according to claim 1, wherein the recording device receives the data divided in segments, and the display device receives the signal while the recording device is receiving the data divided in segments.

10. A control program comprising:
    a requesting step of requesting data from a data source;
    a recording step of recording data received from the data source;
    a first controlling step of controlling a display in accordance with a signal from the data source, the first display indicating that requesting data by the request device is acceptable; and
    a second controlling step of controlling the display device in accordance with a predetermined time period in which requesting data by the request device is acceptable.

11. A control program according to claim 10, further comprising a step of counting the predetermined time period by a counting device, wherein the control device controls the display device in accordance with counting of the predetermined time period.

12. A control program according to claim 11, wherein the control device controls the display device depending on whether the predetermined time reaches a timeout.

13. A control program according to claim 10, wherein the first controlling step controls the display to perform a second display after performing the first display in accordance with the signal and before the end of the predetermined time period in which requesting data by the request device is acceptable.

14. A control program according to claim 10, wherein the requesting step stores an instruction for requesting second data, and requests the second data from the data source after the first data is received from the data source.

15. A control program according to claim 10, wherein the recording step receives the data divided in segments, and the first controlling step receives the signal while the recording step is receiving the data divided in segments.

16. A print control system for controlling at least one recording apparatus connected to a data source via a network, the system comprising:

a request device that requests data from the data source;

a recording device that records data received from the data source;

a display device that performs a first display in accordance with a signal from the data source, the first display indicating that requesting data by the request device is acceptable; and a control device that controls the display device in accordance with a predetermined time period in which requesting data by the request device is acceptable.

17. A print control system according to claim 16, wherein the predetermined time period is counted by a counting device, and the control device controls the display device in accordance with counting of the predetermined time period.

18. A print control system according to claim 17, wherein the control device controls the display device depending on whether the predetermined time reaches a timeout.

19. A print control system according to claim 16, wherein the display device performs a second display after performing the first display and before the end of the predetermined time period in which requesting data by the request device is acceptable.

20. A recording apparatus according to claim 16, wherein the request device comprises a storing device for storing an instruction for requesting second data, and requests second data from the data source after the first data is received from the data source.

* * * * *

UNITED STATES PATENT AND TRADEMARK OFFICE
CERTIFICATE OF CORRECTION

PATENT NO. : 6,722,800 B2
DATED : April 20, 2004
INVENTOR(S) : Kimura

It is certified that error appears in the above-identified patent and that said Letters Patent is hereby corrected as shown below:

Title page,
Item [56], References Cited, FOREIGN PATENT DOCUMENTS, "11215455 A" should read -- 11-215455 A --; and "2001160939 A" should read -- 2001-160939 A --.

Column 1,
Line 63, "an" should read -- a --.

Column 4,
Line 15, "sends" should read -- send --.

Column 9,
Line 2, "button 24" should read -- button 304 --;
Line 17, "projector 302," should read -- projector 303, --; and
Line 63, "printer 301a-301g" should read -- printers 301a-301g --.

Column 11,
Line 57, "requests" should read -- of requests --.

Column 12,
Line 50, "structure" should read -- structured --;
Line 56, "form" should read -- from --; and
Line 57, "display" should read -- displays --.

Signed and Sealed this

First Day of March, 2005

JON W. DUDAS
*Director of the United States Patent and Trademark Office*